US009869321B2

United States Patent
Ishihara et al.

(10) Patent No.: US 9,869,321 B2
(45) Date of Patent: Jan. 16, 2018

(54) WATERPROOF AXIAL FLOW FAN (71) Applicant: SANYO DENKI CO., LTD., Tokyo (JP)

(72) Inventors: Katsumichi Ishihara, Tokyo (JP); Akira Nakayama, Tokyo (JP); Tatsuya Midorikawa, Tokyo (JP); Masato Kakeyama, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 361 days.

(21) Appl. No.: 14/570,108

(22) Filed: Dec. 15, 2014

(65) Prior Publication Data
US 2015/0167682 A1 Jun. 18, 2015

(30) Foreign Application Priority Data
Dec. 18, 2013 (JP) .................. 2013-261767

(51) Int. Cl.
*F04D 25/06* (2006.01)
*F04D 19/00* (2006.01)
(Continued)

(52) U.S. Cl.
CPC ....... *F04D 25/0686* (2013.01); *F04D 19/002* (2013.01); *F04D 25/0613* (2013.01);
(Continued)

(58) Field of Classification Search
CPC ............... F04D 19/002; F04D 25/0613; F04D 25/0646; F04D 25/0686; F04D 25/064;
(Continued)

(56) References Cited

U.S. PATENT DOCUMENTS 3,046,604 A * 7/1962 Franks .................. H02K 15/12
249/108
4,048,530 A * 9/1977 Kaufman, Jr. ........... H02K 5/04
310/43
(Continued)

FOREIGN PATENT DOCUMENTS

EP 2068003 A2 * 6/2009 ......... F04D 25/0613
JP 07-195933 8/1995
(Continued)

OTHER PUBLICATIONS

Japanese Office Action dated Oct. 25, 2016 for the corresponding Japanese Patent Application No. 2013-261767.
(Continued)

*Primary Examiner* — Devon Kramer
*Assistant Examiner* — Benjamin Doyle
(74) *Attorney, Agent, or Firm* — Rankin, Hill & Clark LLP (57) ABSTRACT

A waterproof axial flow fan includes: a rotor having a rotating shaft pivotally supported by a bearing in a rotatable manner, an impeller provided to a tip of the rotating shaft and a rotor cover; a stator having a winding and a circuit board, a surface of which is coated with an electrically insulating synthetic resin; and at least one ring collection groove part formed in a resin surface opposing to the rotor cover at an apex of the stator so as to surround a tip of a bearing holding part for holding the bearing.

18 Claims, 6 Drawing Sheets

(51) Int. Cl.
  *H02K 5/12* (2006.01)
  *H02K 5/16* (2006.01)
  *H02K 15/10* (2006.01)
  *H02K 5/10* (2006.01)
  *H02K 5/08* (2006.01)
  *F04D 29/02* (2006.01)

(52) U.S. Cl.
  CPC ....... *F04D 25/0646* (2013.01); *F04D 29/023* (2013.01); *H02K 5/08* (2013.01); *H02K 5/10* (2013.01); *H02K 5/12* (2013.01); *H02K 5/16* (2013.01); *H02K 15/10* (2013.01); *H02K 2205/09* (2013.01)

(58) Field of Classification Search
  CPC .......... F04D 29/023; H02K 5/10; H02K 5/12; H02K 5/16; H02K 5/08; H02K 2205/09; H02K 15/10
  USPC ...... 417/423.11, 423.5, 354; 310/87, 88, 43, 310/67 R, 90, 85, 89, 261.1
  See application file for complete search history.

(56) References Cited

U.S. PATENT DOCUMENTS

| | | | | |
|---|---|---|---|---|
| 4,128,527 A * | 12/1978 | Kinjo | ...................... | H02K 3/32 310/43 |
| 4,352,897 A * | 10/1982 | Ogata | .................... | C08K 13/04 310/43 |
| 4,387,311 A * | 6/1983 | Kobayashi | ............... | H02K 5/08 310/43 |
| 6,158,985 A * | 12/2000 | Watanabe | ............. | F04D 29/083 417/423.14 |
| 6,359,354 B1 * | 3/2002 | Watanabe | ................ | H02K 5/08 310/154.45 |
| 6,844,636 B2 * | 1/2005 | Lieu | .................... | G11B 19/2009 29/596 |
| 7,928,348 B2 * | 4/2011 | Neal | ................. | B29C 45/14639 219/628 |
| 8,492,939 B2 * | 7/2013 | Hasegawa | ............. | F04D 29/023 310/43 |
| 8,643,232 B2 * | 2/2014 | Hung | ..................... | H02K 1/187 29/596 |
| 8,651,830 B2 * | 2/2014 | Shen | ...................... | F04D 29/083 310/89 |
| 8,922,076 B2 * | 12/2014 | Hsieh | ..................... | H02K 5/128 310/43 |
| 8,987,958 B2 * | 3/2015 | Chen | ..................... | H02K 1/185 310/43 |
| 2004/0145250 A1 * | 7/2004 | Kudo | ................... | F04D 29/023 310/43 |
| 2004/0256933 A1 * | 12/2004 | Toyokawa | ........... | H02K 5/1675 310/89 |
| 2005/0012416 A1 * | 1/2005 | Huang | .................... | F04D 25/06 310/88 |
| 2005/0123423 A1 * | 6/2005 | Weisser | ................ | F04D 29/083 417/423.7 |
| 2007/0085426 A1 * | 4/2007 | Lee | .......................... | H02K 1/04 310/43 |
| 2007/0126296 A1 * | 6/2007 | Lee | .......................... | H02K 5/04 310/86 |
| 2007/0145842 A1 * | 6/2007 | Zhu | ....................... | F04D 29/582 310/88 |
| 2008/0018181 A1 * | 1/2008 | Neal | ....................... | H02K 9/20 310/54 |
| 2010/0133928 A1 * | 6/2010 | Harata | .................. | H02K 1/187 310/43 |
| 2010/0272586 A1 * | 10/2010 | Hsu | ....................... | F04D 29/063 417/354 |
| 2011/0074230 A1 * | 3/2011 | Hasegawa | ............. | F04D 29/023 310/43 |
| 2011/0120073 A1 * | 5/2011 | Flanary | .................... | H02K 5/08 56/250 |
| 2012/0126644 A1 * | 5/2012 | Wu | .......................... | H02K 5/12 310/64 |
| 2012/0134792 A1 * | 5/2012 | Wu | ..................... | F04D 25/0613 415/198.1 |
| 2012/0139387 A1 * | 6/2012 | Hung | ..................... | H02K 1/187 310/216.137 |
| 2014/0112807 A1 * | 4/2014 | Chen | ....................... | H02K 5/10 417/423.7 |
| 2014/0263210 A1 * | 9/2014 | Chang | .................... | B23K 26/20 219/121.64 |
| 2014/0294621 A1 * | 10/2014 | Narita | ................. | F04D 25/0613 417/354 |
| 2014/0333158 A1 * | 11/2014 | Tamaki | .................... | H02K 5/08 310/43 |
| 2015/0167682 A1 * | 6/2015 | Ishihara | ............... | F04D 25/0686 417/354 |
| 2016/0126798 A1 * | 5/2016 | Kawanori | ................ | H02K 5/10 62/508 |

FOREIGN PATENT DOCUMENTS

| | | |
|---|---|---|
| JP | 10191611 A2 | 7/1998 |
| JP | 10-215537 | 8/1998 |
| JP | 2003111373 A2 | 4/2003 |
| JP | 2003164107 A2 | 6/2003 |

OTHER PUBLICATIONS

Extended European Search Report dated Apr. 30, 2015 issued in the corresponding European Patent Application No. 14196815.6.

* cited by examiner

FIG. 12 ically insulating synthetic resin; and at least one ring collection groove part formed in a resin surface opposing to the rotor cover at an apex of the stator so as to surround a tip of a bearing holding part for holding the bearing.

WATERPROOF AXIAL FLOW FAN

CROSS-REFERENCE TO RELATED APPLICATION

This application claims priority from Japanese Patent Application No. 2013-261767 filed with the Japan Patent Office on Dec. 18, 2013, the entire content of which is hereby incorporated by reference.

BACKGROUND

1. Technical Field

The present disclosure relates to a waterproof axial flow fan.

2. Related Art

An axial, flow fan has, for example, a rotary motor as a rotary driving device, an impeller mounted to a rotating shaft of the rotary motor and having a plurality of rotor blades, and a cylindrical casing forming an airflow together with the impeller.

In particular, in a waterproof axial flow fan, a stator of the rotary motor is coated with resin. Therefore, in the waterproof axial flow fan, the gap between a resin surface at the apex of stator and a rotary cover is narrow. Thus, the waterproof axial flow fan basically has such a structure that water does not easily reach a bearing.

JP-A-07-195933, for example, discloses a technique for preventing infiltration of water in the axial flow fan. According to the fan shape disclosed in this publication, there is provided a drip part covering the circumference of the rotating shaft. The drip part is provided with a flange-like drip ring for preventing the infiltration of water into the motor. A watertight cylinder is provided at the center of the impeller to cover the circumference of the rotating shaft and reach the vicinity of the motor. The tip of the watertight cylinder protrudes further than the drip ring toward the motor.

According to the fan shape disclosed in JP-A-07-195933, there are provided the flange-like drip ring and the watertight cylinder covering the circumference of the rotating shaft and reaching the vicinity of the motor. This suppresses the infiltration of water into the hearing of the motor.

Further, in the waterproof structure of the fan driving motor disclosed in JP-A-10-215537, the boss of the fan has a ring-like rib surrounding a bearing holding part. In the outer circumference of the rib, an inclined surface having a diameter that decreases toward die tip is formed.

According to the waterproof structure of the fan driving motor disclosed in JP-A-10-215537, a droplet dropped on the rib quickly falls down on the inclined surface. Therefore, a large amount of water does not remain on the rib. The water falls down onto the upper surface of the bearing holding part little by little and drops downward along the arc surface. This suppresses inflow of the water into the bearing part from the tip of the bearing holding part.

SUMMARY

A waterproof axial flow fan includes: a rotor having a rotating shaft pivotally supported by a bearing in a rotatable manner, an impeller provided to a tip of the rotating shaft, and a rotor cover; a stator having a winding and a circuit board, a surface of which is coated with an electrically insulating synthetic resin; and at least one ring collection groove part formed in a resin surface opposing to the rotor

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The fan shape disclosed in JP-A-07-195933 is provided with the drip part covering the circumference of the rotating shaft, the flange-like drip ring, and the watertight cylinder covering the circumference of the rotating shaft and reaching the vicinity of the motor.

In the waterproof structure of the fan driving motor disclosed in JP-A-10-215537, the ring-like rib having the inclined surface formed around the outer circumference of the tip is provided so as to surround the bearing holding part.

That is, according to the techniques of JP-A-07-195933 and JP-A-10-215537, the infiltration of water into the bearing is suppressed by adding further component parts to the motor. This results in the complicated structure of the fan driving motor and the increased manufacturing cost.

In contrast, such type of a waterproof axial flow fan that, has the stator coated with resin has simple structure and does not require any additional parts.

In the conventional waterproof axial flow fan, however, the gap between the resin surface at the apex of the stator and the rotor cover is narrow. Therefore, in some structure, when water enters this narrow gap, the water is likely to run along this gap due to the capillary phenomenon and flow into the bearing.

One of the purposes of the present disclosure is to provide a waterproof axial flow fan that has simple structure requiring no additional parts and is able to suppress the infiltration of water into a bearing to have high reliability.

A waterproof axial flow fan according to one embodiment of the present disclosure (the present waterproof axial flow fan) includes: a rotor having a rotating shaft pivotally supported by a bearing in a rotatable manner, an impeller provided to the tip of the rotating shaft, and a rotor cover; and a stator having a winding and a circuit board, in which the surface of the stator is coated with an electrically insulating synthetic resin.

Furthermore, the present waterproof axial flow fan has at least one ring-like collection groove part formed in a resin surface opposing to the rotor cover at an apex of the stator so as to surround a tip of a bearing holding part provided for holding the bearing.

That is, in the present waterproof axial flow fan, at least one ring-like collection groove part is formed in the resin surface opposing to the rotor cover at the apex of the stator so as to surround the tip of the bearing holding part.

The collection groove part partially forms a space having a wide clearance (width) in a narrow gap between, the resin surface at the apex of the stator and the rotor cover. Thus, the capillary phenomenon is difficult to occur. Even when water enters the narrow gap between the resin surface at the apex of the stator and the rotor cover, the water entered is collected by the collection groove part.

Therefore, according to the present waterproof axial flow fan, the infiltration of water into the bearing can be prevented or suppressed. This results in the enhancement of the reliability of the waterproof axial flow fan.

A waterproof axial flow fan according to an embodiment 1 to an embodiment 3 will be described below by referring to the drawings.

The waterproof axial flow fan according to the present disclosure has at least one ring-like collection groove part formed in the resin surface opposing to the rotor cover at the apex of the stator so as to surround the tip of the bearing holding part. The collection groove part partially forms a space having a wide clearance (width) in a narrow gap between the resin surface at the apex of the stator and the rotor cover. Thereby, even when water enters the narrow gap, the water entered is collected by the collection groove part. Therefore, according to the present waterproof axial flow fan, the infiltration of water into the bearing can be prevented or suppressed. This results in the enhancement of the reliability of the waterproof axial flow fan.

Embodiment 1

[Arrangement of Waterproof Axial Flow Fan]

Figure 1:
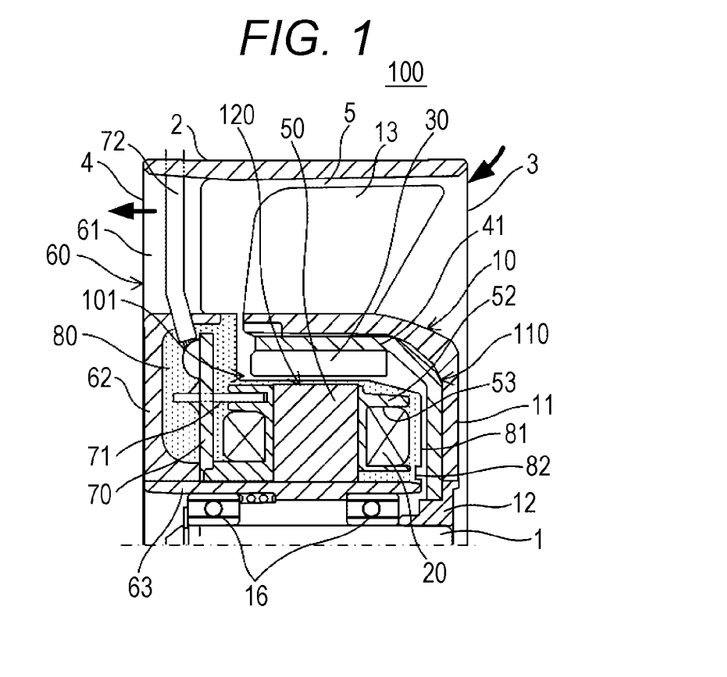
FIG. 1 is a sectional view of an upper half part of a waterproof axial flow fan of an embodiment 1.
Figure 2:
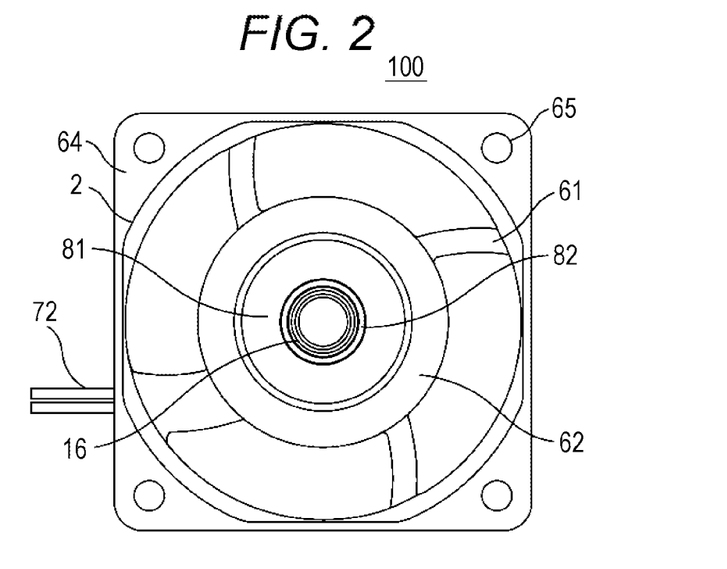
FIG. 2 is a front view of the waterproof axial flow fan of the embodiment 1 in a state where a rotor is removed and a resin coated portion of a stator is exposed.
Figure 3:
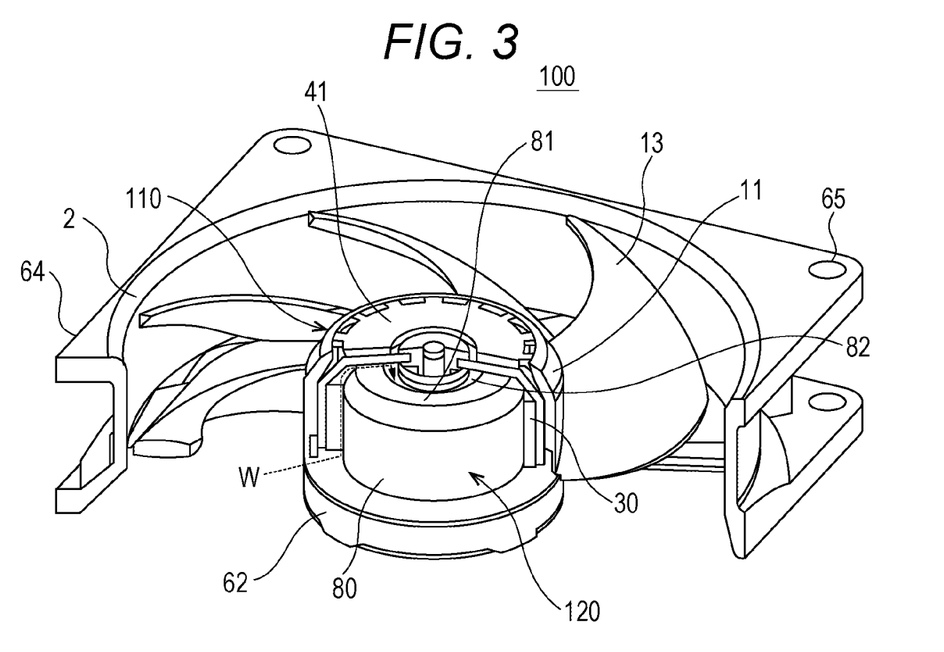
FIG. 3 is a partial cutaway perspective view of the waterproof axial flow fan of the embodiment 1.

The arrangement of the waterproof axial flow fan of the embodiment 1 will be described by referring to FIG. 1 to FIG. 3. FIG. 1 is a sectional, view of the upper half part of the waterproof axial How fan of the embodiment 1. FIG. 2 is a front view of the waterproof axial flow fan of fee embodiment 1 in a state where a rotor is removed and a resin coated portion of a stator is exposed. FIG. 3 is a partial cutaway perspective view of the waterproof axial flow fan of the embodiment 1.

The waterproof axial flow fan is a blowing apparatus that is adapted to suck, the air from one side in the axial direction of the rotating shaft and discharge the air to the other side in the axial direction by the rotation of the impeller fixed to the rotating shaft of the rotary motor.

As illustrated in FIG. 1, a waterproof axial flow fan 100 has an impeller 10 provided to (fixed to) a rotating shaft 1 (for example, the tip of the rotating shaft 1), and a cylindrical casing 2. The casing 2 surrounds the outer circumference of the impeller 10 in the radial direction.

The impeller 10 has a substantially cup-shaped hub 11 at the center. The impeller 10 has a plurality of rotor blades 13 on the outer circumference of the hub 11. The hub 11 is fixed to the rotating shaft 1 via a bushing 12.

Inside the hub 11, a rotary motor 101 is disposed as a rotary driving apparatus for the impeller 10. The rotary motor 101 of the present embodiment is provided by, for example, an outer-rotor type brushless motor, for example. The rotary motor 101 has an inside stator 120 and an outside rotor 110. The inside stator 120 is an armature having a winding 20. The outside rotor 110 is an excitation part having a permanent magnet 30 disposed on the outer circumference of the inside stator 120.

The plurality of rotor blades 13 is mounted to the circumference of the hub 11 of the impeller 10 in a radial manner. Each rotor blade 13 is provided so as to be inclined with respect to the axial direction of the rotating shaft 1.

The impeller 10 generates an airflow between the rotor blades 13 and the casing 2 by the rotation of the impeller 10. The rotor blades 13 are formed in such a shape and structure that generates the airflow from the hub 11 side of the impeller 10 to a frame hub 62 side.

The rotor 110 has a substantially cup-like rotor cover 41, the rotating shaft 1, the permanent magnet 30, and the like. The rotating shaft 1 is press-fitted to the center part of the rotor cover 41 by the bushing 12.

The rotor cover 41 is fitted into the hub 11. The permanent magnet 30 is fixed to the inner circumference surface along the axial direction of the rotor cover 41. The rotor cover 41 has a function of closing the line of magnetic force from the excitation part (the outside rotor 110) to maximize the electromagnetic induction effect of the permanent magnet 30.

For the composition material, of the rotor cover 41, an iron-base magnetic material such as an SC material is used, for example. However, the composition material of the rotor cover 41 is not limited to the exemplified material.

The rotating shaft 1 is rotatably supported by a bearing 16. The hearing 16 is fixed to the inner surface of a cylindrical bearing holding part (a bushing) 63. The bearing holding part 63 supports the bearing 16. The bearing holding part 63 is fixed to the center of the frame hub 62.

The frame hub 62 has a substantially cup-like shape and forms a base part of the stator 120. The frame hub 62 is arranged at one side in the axial direction of the rotating shaft 1. The hub 11 of the impeller 10 is located at the opposite side of the frame hub 62 in the axial direction (the other side in the axial direction) of the rotating shaft 1.

On the other hand, the stator 120 has a stator stack 50, the winding 20, and the like.

The stator stack 50 is fixed to the outer surface of the bearing holding part 63. The stator stack 50 is formed by stacking a plurality of thin metal sheets in the thickness direction of the sheet, in which each of the thin metal sheets has a substantially ring-like shape. The composition material of the metal sheets of the stator stack 50 may be a silicon steel sheet, for example, for having both good performance and cost. The metal sheets of the stator stack 50 are stacked by a mechanical pressure-welding, for example.

An insulator 52 is provided recessed in the stator stack 50. A slot 53 as a recess part is defined in the insulator 52. The slot 53 is disposed substantially evenly in the circumferential direction of the stator stack 50. The winding 20 wound around the stator stack 50 is accommodated in the slot 53.

The frame hub 62 supports a circuit board (a printed board) 70. Wiring patterns for controlling the waterproof axial flow fan 100 are formed on the circuit board 70.

The winding 20 wound around the stator stack 50 and the circuit hoard 70 are electrically connected to each other via a connection terminal 71. The connection terminal 71 aggregates the connecting wires of the winding 20 and connects them to the circuit board 70.

In the circuit board 70, a through hole for inserting the connection terminal 71 therein is bored. The protrusion part of the connection terminal 71 inserted in the through hole is soldered to the circuit board 70. A lead wire 72 for supplying a power source is connected to the circuit board 70 by solder.

The surface (the circumference) of the stator 120 including the stator stack 50, the winding 20, and the circuit board 70 is coated with an electrically insulating synthetic resin 80. With the surface (the circumference) of the stator 120 being coated with an electrically insulating synthetic resin 80, the electrical connection part such as the winding 20 and the circuit hoard 70 are protected from moisture.

As illustrated, in FIG. 1 to FIG. 3, in the waterproof axial flow fan 100 of the embodiment 1, a ring-like collection groove part 82 is formed in the resin surface 81 opposing to the rotor cover 41 at the apex of the resin-coated stator 120. The ring-like collection groove part 82 is formed so as to surround the circumference of the tip of the bearing holding part 63.

In the embodiment 1, one ring-like collection groove part 82 is formed in the resin surface 81 around the tip of the bearing holding part 63. As illustrated in FIG. 1, the cross-section of the collection groove part 82 is shaped in a rectangular. The cross-section of the collection groove part 82 may be shaped in other form such as a semicircle without limited to the above-described shape.

The casing 2 defines a wind, tunnel 5 that guides the airflow and defines an intake port 3 and an exhaust port 4 for the air at both ends. The casing 2 is integrally formed with a frame 60 having a flange part 64 (see FIG. 2). The flange part 64 of the present embodiment is formed in a rectangular shape. At four corners of the flange part 64, insertion, holes 65 for mounting not-shown, mourning screws therein are opened.

[Effect of Waterproof Axial Flow Fan]

Next, the effect of the waterproof axial flow fan 100 of the embodiment 1 will be described by referring to FIG. 1 to FIG. 3.

The waterproof axial flow fan 100 is mounted to a housing of electronic equipment, for example. In mounting the waterproof axial flow fan 100 to the housing of electronic equipment, mounting screws are screwed through the insertion holes 65 of the flange part 64 at the intake side or the exhaust side of the casing 2 (See FIG. 2).

In response that the rotary motor 101 is driven and each impeller 10 of the waterproof axial flow fan 100 is rotated, air is sucked from the intake port 3 of the casing 2. The air sucked from the intake port 3 of the casing 2 passes through the rotor blades 13 and the frame 60 serving as the stator blade and is exhausted from the exhaust port 4 of the casing 2.

The waterproof axial, flow fan 100 has watertight structure. That is, in the waterproof axial flow fan 100, the surface (the circumference) of the stator 120 including the stator stack 50, the winding 20, and the circuit board 70 is coated with an electrically insulating synthetic resin 80. Therefore, the waterproof axial flow fan 100 can be used under the environment where water is scattered.

In the waterproof axial flow fan 100, the gap between the resin-coated stator 120 and the rotor cover 41 is narrow. Thus, when water enters this narrow gap between the resin surface 81 at the apex of the stator 120 and the rotor cover 41, the water is likely to run along this gap due to the capillary phenomenon and flow into the bearing 16.

In the waterproof axial flow fan 100 illustrated in FIG. 1 to FIG. 3, however, one ring-like collection groove part 82 is formed in the resin surface 81 opposing to the rotor cover 41 at the apex of the resin-coated stator 120 so as to surround the tip of the hearing holding part 63.

In the waterproof axial slow fan 100, the ring-like collection groove part 82 is formed in the resin surface 81 around the tip of the bearing holding part 63. Thereby, a space having a wide clearance (width) is partially provided by the collection groove part 82. This space having the wide clearance (width) may be a portion where the gap between, the resin surface at the apex of the stator 120 and the rotor cover 41 is wide.

As mentioned above, in the waterproof axial flow fan 100, the wide space (the space having the wide clearance) is formed in the narrow gap between the resin surface 81 at the apex of the stator 120 and the rotor cover 41 by the collection groove part 82. Thus, the capillary phenomenon is difficult to occur. Even when water W enters the narrow gap between the resin surface 81 at the apex of the stator 120 and the rotor cover 41, the water W entered is collected by the collection groove part 82.

That is, according to the waterproof axial flow fan 100 of the embodiment 1, the infiltration of water into the bearing 16 can be prevented or suppressed with the simple structure that does not require any additional parts. This results in the enhancement of the reliability of the waterproof axial flow fan 100.

Embodiment 2

Figure 4:
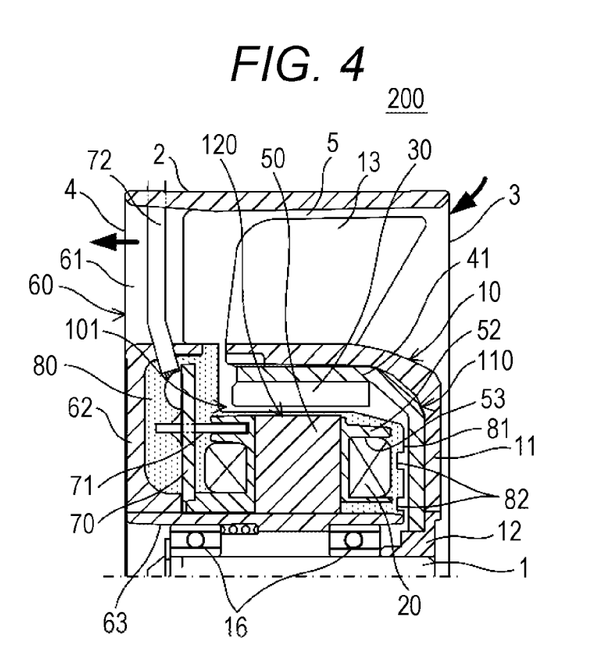
FIG. 4 is a sectional view of an upper half part of a waterproof axial flow fan of an embodiment 2.
Figure 5:
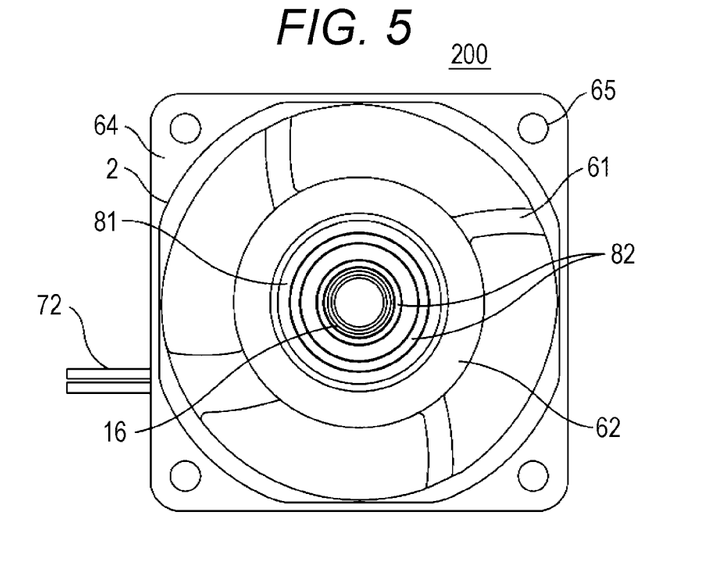
FIG. 5 is a front view of the waterproof axial flow fan of the embodiment 2 in a state where a rotor is removed and a resin coated portion of a stator is exposed.
Figure 6:
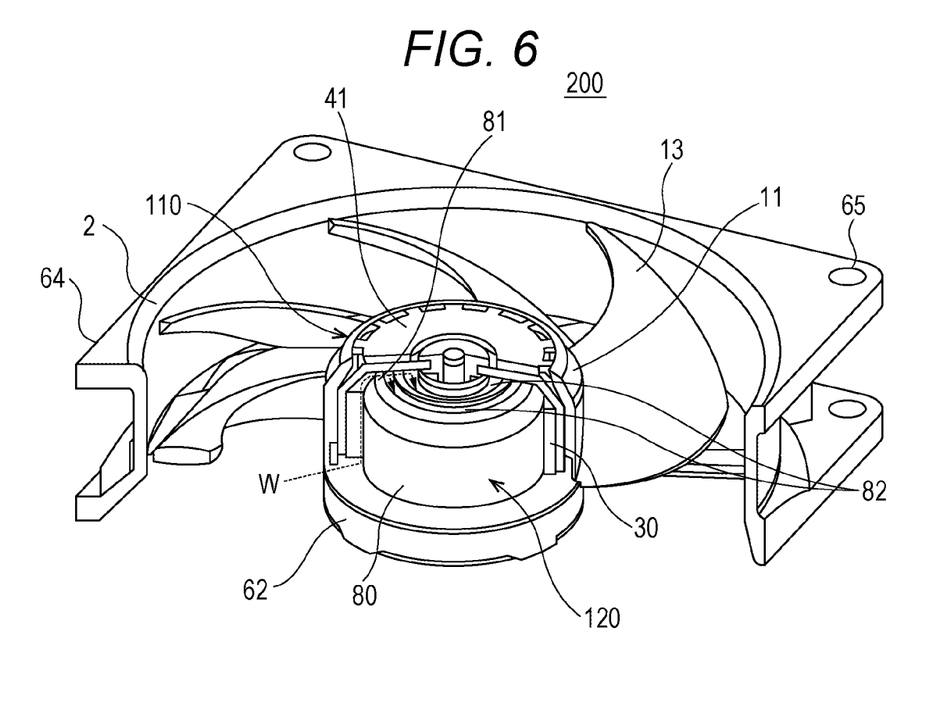
FIG. 6 is a partial cutaway perspective view of the waterproof axial flow fan of the embodiment 2.

Next, the arrangement of the waterproof axial flow fan of the embodiment 2 will, be described by referring to FIG. 4 to FIG. 6. FIG. 4 is a sectional view of the upper half part of the waterproof axial flow fan of the embodiment 2. FIG. 5 is a front view of the waterproof axial flow fan of the embodiment 2 in a state where the rotor is removed and the resin coated portion of the stator is exposed. FIG. 6 is a partial cutaway perspective view of the waterproof axial flow fan of the embodiment 2. It is noted that, in the embodiment 2, the same components as in the embodiment 1 will be designated with, the same reference numerals and the description, thereof will be omitted.

As illustrated in FIG. 4 to FIG. 6, a waterproof axial flow fan 200 of the embodiment 2 is different from that of the embodiment 1 in that a plurality of ring-like collection groove parts 82 is formed, in the resin, surface 81 around the tip of the bearing holding part 63.

That is, in the waterproof axial How fan 200 of the embodiment 2, the electrically insulating synthetic resin 80 is formed on the surface (the circumference) of the stator 120 including the winding 20 and circuit board 70, similarly to the embodiment 1.

The ring-like collection groove parts 82 are formed in the resin surface 81 opposing to the rotor cover 41 at the apex of the resin-coated stator 120. The ring-like collection groove parts 82 are formed, in the resin surface 81 at the apex of the stator 120 so as to surround the tip of the bearing holding part 63.

The ring-like collection groove parts 82 are concentrically formed in the resin surface 81 around the tip of the bearing holding part 63, In the present embodiment, two ring-like collection groove parts 82 are concentrically formed in the resin surface 81 around the tip of the bearing holding part 63.

The number of the ring-like collection groove parts 82 is not limited to two. The number of the ring-like collection groove parts 82 is set to a proper number depending on the outer diameter of the resin, surface 81 at the apex of the stator 120.

It is noted that, although the plurality of ring-like collection groove parts 82 is formed in the resin surface 81 at the apex of the stator 120 in the present embodiment the plurality of collection groove parts 82 may be formed continuously in a spiral manner.

The waterproof axial flow fan 200 of the embodiment 2 has basically the same effect and advantages as the waterproof axial flow fan 100 of the embodiment 1. In particular, according to the waterproof axial How fan 200 of the embodiment 2, the plurality of ring-like collection groove parts 82 is formed in the resin surface 83 around the tip of the bearing holding part 63.

Therefore, the waterproof axial, flow fan 200 of the embodiment 2 has the following advantageous effects. That is, in the waterproof axial flow fan 200, a plurality of spaces each having a wide clearance is formed in the narrow gap between the resin surface 81 at the apex of the stator 120 and the rotor cover 41. Therefore, the infiltration of water due to the capillary phenomenon can be further prevented or suppressed by the plurality of spaces each having the wide clearance. Thereby, even when water W enters the narrow gap between the resin surface 81 at the apex of the stator 120 and the rotor cover 41, it is ensured that the water W entered is collected by the plurality of the collection groove parts 82.

Embodiment 3

Figure 7:
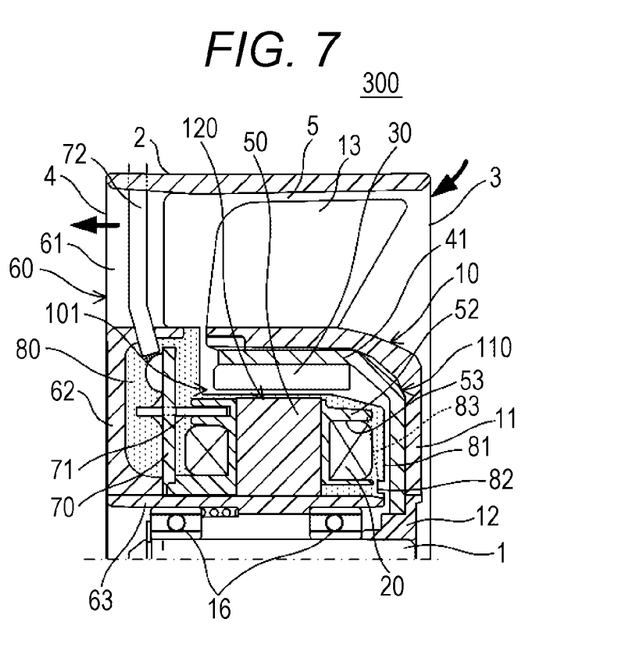
FIG. 7 is a sectional view of an upper half part of a waterproof axial flow fan of an embodiment 3.
Figure 8:
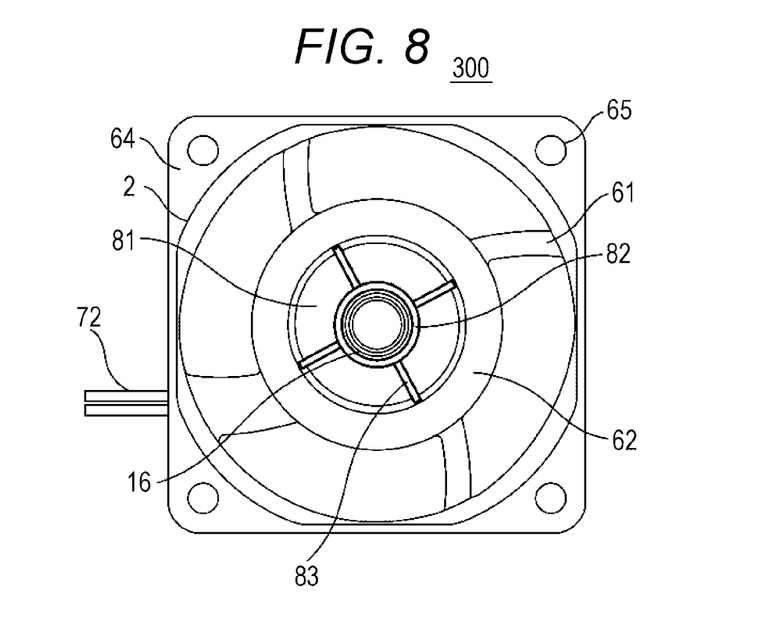
FIG. 8 is a front view of the waterproof axial flow fan of the embodiment 3 in a state where a rotor is removed and a resin coated portion of a stator is exposed.
Figure 9:
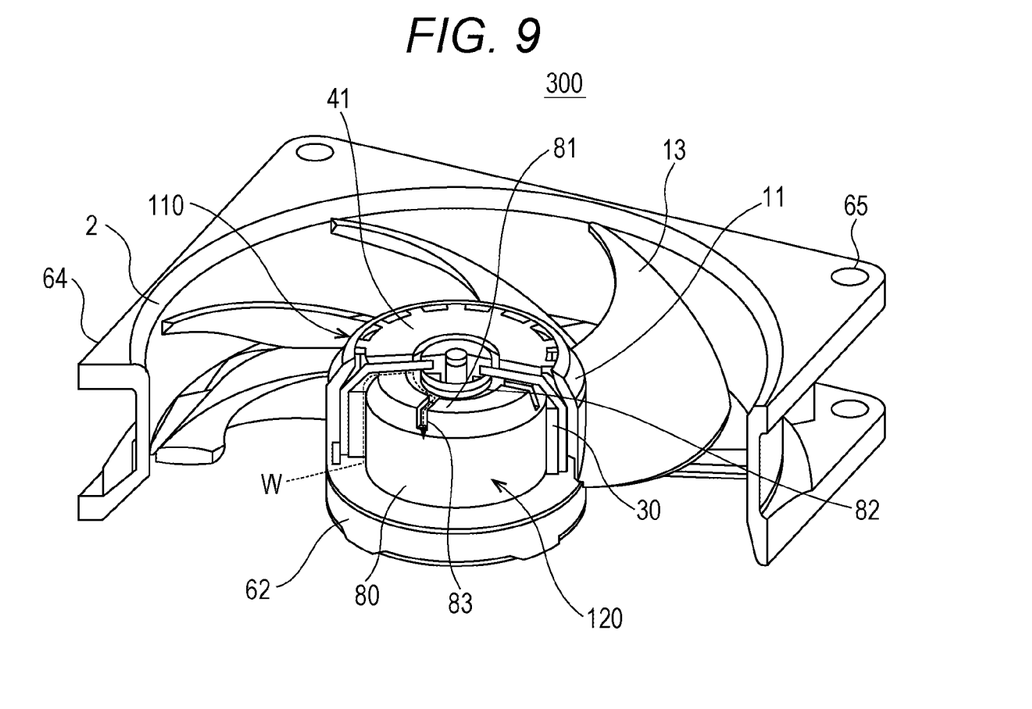
FIG. 9 is a partial cutaway perspective view of the waterproof axial flow fan of the embodiment 3.

Next, the arrangement of the waterproof axial flow fan of the embodiment 3 will be described by referring to FIG. 7 to FIG. 9. FIG. 7 is a sectional view of the upper half part of the waterproof axial flow fan of the embodiment 3. FIG. 8 is a front view of the waterproof axial flow fan of the embodiment 3 in a state where the rotor is removed and the resin coated portion of the stator is exposed. FIG. 9 is a partial cutaway perspective view of the waterproof axial flow fan of the embodiment 3. It is noted that, in the embodiment 3, the same components as in the embodiment 1 will be designated with the same reference numerals and the description thereof will be omitted.

As illustrated in FIG. 7 to FIG. 9, a waterproof axial flow fan 300 of the embodiment 3 is different from that of the embodiment 1 in that a plurality of exhaust groove parts 83 is formed so as to be radially extended from the ring-like collection groove part 82 formed in the resin surface 81 around the tip of the bearing holding part 63.

That is, in the waterproof axial flow fan 300 of the embodiment 3, the electrically insulating synthetic resin 50 is formed on the surface (the circumference) of the stator 120 including the winding 20 and circuit board 70, similarly to the embodiment 1.

One ring-like collection groove part 82 is formed in the resin surface 81 opposing to the rotor cover 41 at the apex of the resin-coated stator 120. The ring-like collection groove part 82 is formed in the resin surface 81 at the apex of the stator 120 so as to surround the tip of the bearing holding part 63.

The waterproof axial flow fan 300 has the plurality of exhaust groove parts 83 radially extended from the collection groove part 82. Each exhaust groove part 83 communicates with the ring-like collection groove part 82.

As illustrated in FIG. 8, in the present embodiment, four exhaust groove parts 83 are formed in four directions in the resin surface 81 at the apex of the stator 120. However, the number of the exhaust groove parts 83 is not limited to four.

As illustrated in FIG. 7, the radial exhaust groove parts 83 are formed so as to be inclined downwardly and outwardly (toward the outside) in the radial direction of the stator 120 from the ring-like collection groove part 82 in the resin surface 81 at the apex of the stator 120. As illustrated in FIG. 9, since each, exhaust groove pan 83 is inclined downwardly and outwardly, the water W that has been collected within the ring-like collection groove part 82 can be easily exhausted.

It is noted that, one ring-like collection groove part 82 is formed in the resin surface 81 at the apex of the stator 120 in the present embodiment. Instead, a plurality of ring-like collection groove parts 82 may be formed as seen in the embodiment 2.

The waterproof axial flow fan 300 of the embodiment 3 has basically the same effect and advantages as the waterproof axial flow fan 100 of the embodiment 1. In particular, the waterproof axial flow fan 300 of the embodiment 3 has the plurality of exhaust groove parts 83 in the resin surface 81 at the apex of the stator 120. These exhaust groove parts 83 are radially extended from the collection groove part 82 and inclined downwardly and outwardly (toward the outside).

Therefore, the waterproof axial flow fan 300 of the embodiment 3 has the following advantageous effects. That is, in the waterproof axial flow fan 300, the ring-like collection groove part 82 prevents or suppresses the capillary phenomenon, so that the water W that would otherwise enter the bearing 16 is collected, in addition to it, in the waterproof axial flow fan 300, the water W collected in the collection groove part 82 can be easily exhausted through the plurality of exhaust groove parts 83 formed in a radial manner.

Embodiment 4

Figure 10:
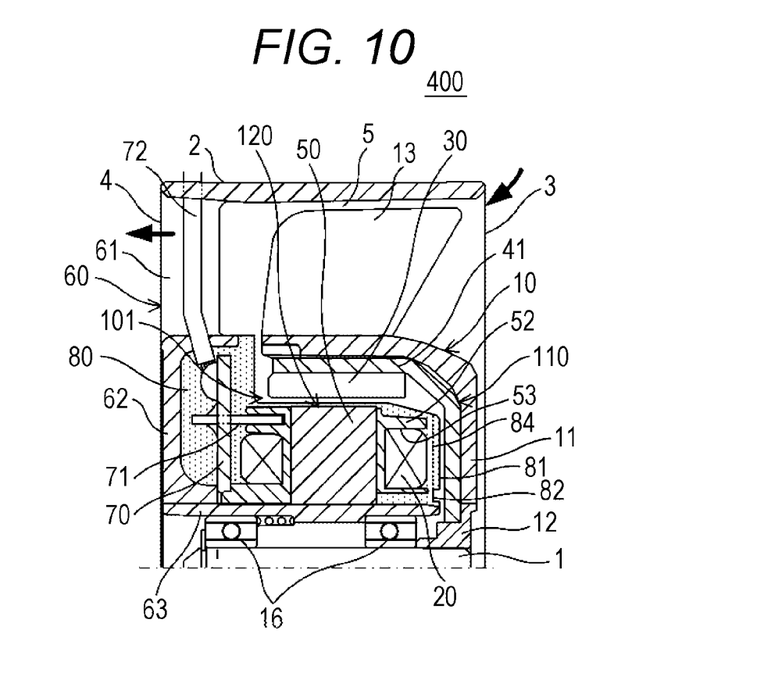
FIG. 10 is a sectional view of an upper half part of a waterproof axial flow fan of an embodiment 4.
Figure 11:
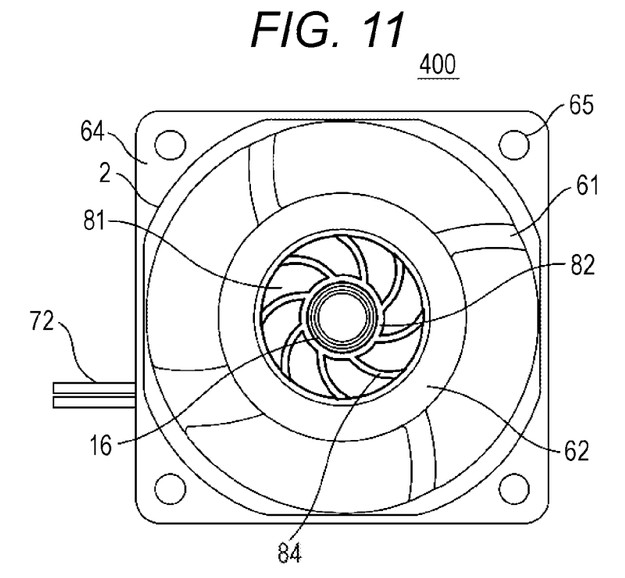
FIG. 11 is a front view of the waterproof axial flow fan of the embodiment 4 in a state where a rotor is removed and a resin coated portion of a stator is exposed.
Figure 12:
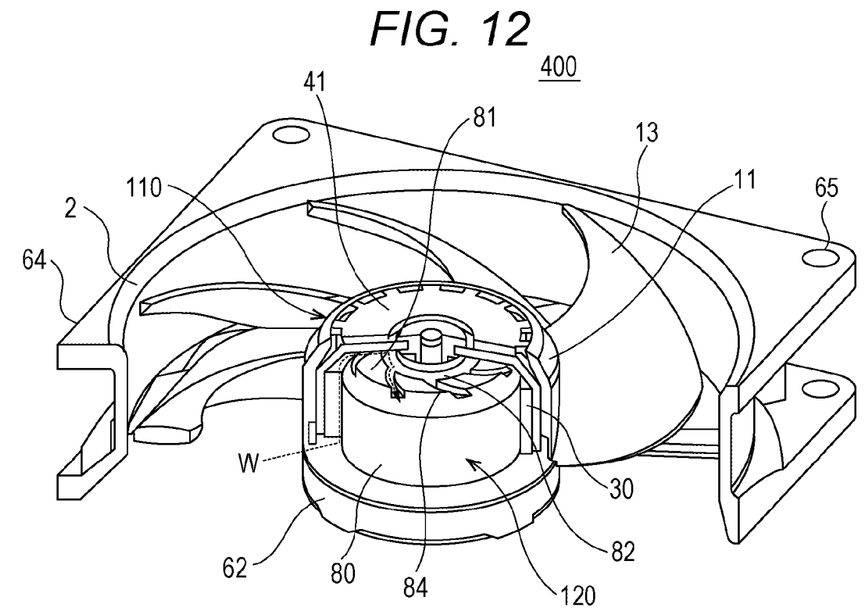
FIG. 12 is a partial cutaway perspective view of the waterproof axial flow fan of the embodiment 4.

Next the arrangement of the waterproof axial flow fan of the embodiment 4 will, be described by referring to FIG. 10 to FIG. 12. FIG. 10 is a sectional, view of the upper half part, of the waterproof axial flow fan of the embodiment 4. FIG. 11 is a front view of the waterproof axial flow fan of the embodiment 4 in a state where the rotor is removed and the resin coated portion of the stator is exposed. FIG. 12 is a partial cutaway perspective view of the waterproof axial flow fan of the embodiment 4. It is noted that, in the embodiment 4, the same components as in the embodiment 1 will be designated with the same reference numerals and the description thereof will be omitted.

As illustrated in FIG. 10 to FIG. 12, a waterproof axial flow fan 400 of the embodiment 4 is different from that of the embodiment 1 in that a plurality of exhaust groove parts 84 is formed so as to be spirally extended from the ring-like collection groove part 82 formed in the resin surface 81 around the tip of the bearing holding part 63.

That is, in the waterproof axial flow fan 400 of the embodiment 4, the electrically insulating synthetic resin 80 is formed on the surface (the circumference) of the stator 120 including the winding 20 and circuit board 70, similarly to the embodiment 1.

One ring-like collection groove part 82 is formed in the resin surface 81 opposing to the rotor cover 41 at the apex of the resin-coated stator 120. The ring-like collection groove part 82 is formed in the resin surface 81 at the apex of the stator 120 so as to surround the tip of the bearing holding part 63.

The waterproof axial flow fan 400 has the plurality of exhaust groove parts 84 spirally extended from the collection groove part 82. Each exhaust groove part 84 communicates with the ring-like collection groove part 82.

As illustrated in FIG. 11, in the present embodiment, eight, exhaust groove parts 84 are formed in eight directions in the resin surface 81 at the apex of the stator 120. However, the number of the exhaust groove parts 84 is not limited to eight.

As illustrated, in FIG. 10, the spiral exhaust groove part 84 is formed Hat in the resin surface 81 at the apex of the stator 320. Without limited to it, the spiral exhaust groove part 84 may be formed so as to be inclined downwardly and outwardly (toward the outside of the stator 120 in the radial direction) from the ring-like collection groove part 82.

As illustrated in FIG. 11 and FIG. 12, the spiral exhaust groove part. 84 is formed so as to bend along the rotation direction of the rotor 110. Therefore, a swinging airflow within the rotor 110 causes effect on the spiral exhaust groove part 84 in no small extent. This swinging airflow allows the water W collected in the ring-like collection groove part 82 to be easily exhausted.

It is noted that, one ring-like collection groove part 82 is formed in the resin surface 81 at the apex of the stator 120 in the present embodiment. Instead, a plurality of ring-like collection groove parts 82 may be formed in the resin surface 81 as seen in the embodiment 2.

The waterproof axial flow fan 400 of the embodiment 4 has basically the same effect and advantages as the waterproof axial flow fan 100 of the embodiment 1. In particular, the waterproof axial flow fan 400 of the embodiment 4 has the plurality of exhaust groove parts 84 in the resin surface 81 at the apex of the stator 120. These exhaust groove parts 84 are spirally extended from the collection groove part 82.

Therefore, the waterproof axial flow fan 400 of the embodiment 4 has the following advantageous effects. That is in the waterproof axial flow fan 400, the ring-like collection groove part 82 prevents or suppresses the capillary phenomenon, so that the water W that would otherwise enter the bearing 16 is collected. In addition to it, in the waterproof axial flow fan 400, the water W collected in the collection groove part 82 can be easily exhausted through the plurality of spiral exhaust groove parts 84.

It is noted that the spiral exhaust groove parts 84 may be arc-shaped exhaust groove parts 84.

Further, the number of the exhaust groove parts 83 and 84 may be one. That is, the ring-like collection groove part 82 may have one or a plurality of exhaust groove parts 83 or 84 extended from the collection groove part 82 outwardly in the radial direction of the stator 120.

The bearing holding part 63 may be extended along the rotating shaft 1 with the bearing 16 being interposed between, the rotating shaft 1 and the bearing holding part 63. The bearing holding part 63 may be arranged at the rotating shaft 1 side rather than at the stator 120 side. The bearing holding part 63 may be arranged between the stator 120 and the bearing 16. The gap between the tip of the bearing holding part 63 (the end at the rotor cover 41 side of the bearing holding part 63) and the rotor cover 41 may be substantially the same as, may be shorter than, or may be longer than the gap between the resin surface 81 opposing to the rotor cover 41 at the apex of the stator 120 and the rotor cover 41.

As set forth, the preferable embodiments of the present disclosure have been described. They are mere examples for the purpose of illustration of the technique of the present disclosure and do not limit the scope of the present disclosure. The technique of the present disclosure can be implemented in various ways which are different from the above-described, embodiments as long as not departing from its spirit.

The present disclosure can relate to the waterproof axial flow fan having the structure for preventing the water infiltration into the bearing of the rotary motor.

Further, the waterproof axial flow fan of the present disclosure may be the following first to seventh waterproof axial flow fans.

The first waterproof axial flow fan includes a rotor having an impeller at the tip of a rotating shaft pivotally supported by a bearing in a rotatable manner and a stator having a winding and a circuit board, wherein the circumference of the stator is coated with an electrically insulating synthetic resin and at least one ring-like collection groove part is formed in a resin surface opposing to a rotor cover at an apex of the stator so as to surround a tip of a bearing holding part.

In the second waterproof axial flow fan according to the first waterproof axial flow fan, a plurality of the ring-like collection groove parts is concentrically formed around the tip of the bearing holding part in the resin part opposing to the rotor cover at the apex of the stator.

In the third waterproof axial flow fan according to the first or second waterproof axial flow fan, the ring-like collection groove part, has a plurality of exhaust groove parts radially extended from the collection groove part outwardly in the radial direction of the stator.

In the fourth waterproof axial flow fan according to the first or second waterproof axial flow fan, the ring-like collection groove part has a plurality of exhaust groove parts spirally extended, from the collection groove part outwardly in the radial direction of the stator.

In the fifth waterproof axial flow fan according to the fourth waterproof axial flow fan, the plurality of exhaust groove parts spirally extended is formed, so as to bend along a rotation direction of the rotor.

In the sixth waterproof axial flow fan according to any one of the third to fifth waterproof axial flow fans, the plurality of exhaust groove parts is inclined downwardly and outwardly in the radial direction of the stator.

The seventh waterproof axial flow fan includes: a bearing; a bearing holding part for holding the bearing; a rotor having a rotating shaft pivotally supported by the bearing in a rotatable manner, an impeller provided at a tip of the rotating shaft, and a rotor cover; a stator having a winding and a circuit board, where a surface of the stator is coated with an electrically insulating synthetic resin; and at least one ring collection groove part formed in a resin surface opposing to the rotor cover at an apex, of the stator so as to surround a tip of a bearing holding part.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood, that the subject matter defined in the appended claims is not necessarily limited to the specific features or acts described above. Rather, the specific features and acts described above ace disclosed as example forms of implementing the claims appended hereto.

What is claimed is:

1. A waterproof axial flow fan comprising:
   a rotor having a rotating shaft pivotally supported by a bearing in a rotatable manner, an impeller provided to a tip of the rotating shaft, and a rotor cover;
   a stator having a winding and a circuit board, a surface of which is coated with an electrically insulating synthetic resin; and
   a collection groove part recessed from a flat surface of the resin opposing to the rotor cover and at an apex of the stator, the collection groove part having a ring shape so as to surround a tip of a bearing holding part for holding the bearing, the flat surface of the resin being closer to the rotor cover in a direction of an axis of the rotating shaft than other surfaces of the resin,
   wherein the collection groove part comprises an inner circle and an outer circle of the ring shape, and the inner circle and the outer circle are located at the flat surface of the resin.

2. The waterproof axial flow fan according to claim 1; wherein the collection groove part is a plurality of collection groove parts, wherein the plurality of collection groove parts are concentrically formed around the tip of the bearing holding part in the resin surface opposing to the rotor cover at the apex of the stator.

3. The waterproof axial flow fan according to claim 1; further comprising an exhaust groove part extended from the collection groove part outwardly in a radial direction of the stator.

4. The waterproof axial flow fan according to claim 3; wherein the exhaust groove part is a plurality of exhaust groove parts, and wherein the plurality of exhaust groove parts are radially extended from the collection groove part outwardly in the radial direction of the stator.

5. The waterproof axial flow fan according to claim 4, wherein the plurality of exhaust groove parts are inclined downwardly and outwardly in the radial direction of the stator.

6. The waterproof axial flow fan according to claim 3; wherein the exhaust groove part is a plurality of exhaust groove parts, and wherein the plurality of exhaust groove parts are spirally extended from the collection groove part outwardly in the radial direction of the stator.

7. The waterproof axial flow fan according to claim 6; wherein the plurality of exhaust groove parts are formed so as to bend along a rotating direction of the rotor.

8. The waterproof axial flow fan according to claim 7; wherein the plurality of exhaust groove parts are inclined downwardly and outwardly in the radial direction of the stator.

9. The waterproof axial flow fan according to claim 6; wherein the plurality of exhaust groove parts are inclined downwardly and outwardly in the radial direction of the stator.

10. The waterproof axial flow fan according to claim 3; wherein the exhaust groove part is inclined downwardly and outwardly in the radial direction of the stator.

11. A waterproof axial flow fan comprising:
    a rotor having a rotating shaft pivotally supported by a bearing in a rotatable manner, an impeller provided to a tip of the rotating shaft, and a rotor cover;
    a stator having a winding and a circuit board, a surface of which is coated with an electrically insulating synthetic resin;
    a ring collection groove part formed in a resin surface opposing to the rotor cover at an apex of the stator so as to surround a tip of a bearing holding part for holding the bearing; and
    an exhaust groove part extended from the ring collection groove part outwardly in a radial direction of the stator.

12. The waterproof axial flow fan according to claim 11; wherein the exhaust groove part is a plurality of exhaust groove parts, and wherein the plurality of exhaust groove parts are radially extended from the ring collection groove part outwardly in the radial direction of the stator.

13. The waterproof axial flow fan according to claim 12; wherein the plurality of exhaust groove parts are inclined downwardly and outwardly in the radial direction of the stator.

14. The waterproof axial flow fan according to claim 11; wherein the exhaust groove part is a plurality of exhaust groove parts, and wherein the plurality of exhaust groove parts are spirally extended from the ring collection groove part outwardly in the radial direction of the stator.

15. The waterproof axial flow fan according to claim 14; wherein the plurality of exhaust groove parts are formed so as to bend along a rotating direction of the rotor.

16. The waterproof axial flow fan according to claim 15; wherein the plurality of exhaust groove parts are inclined downwardly and outwardly in the radial direction of the stator.

17. The waterproof axial flow fan according to claim 14; wherein the plurality of exhaust groove parts are inclined downwardly and outwardly in the radial direction of the stator.

18. The waterproof axial flow fan according to claim 11; wherein the exhaust groove part is inclined downwardly and outwardly in the radial direction of the stator.

* * * * *